March 25, 1958  E. RAWSON  2,827,920
PULSATOR ASSEMBLY
Original Filed Aug. 23, 1949  3 Sheets-Sheet 3
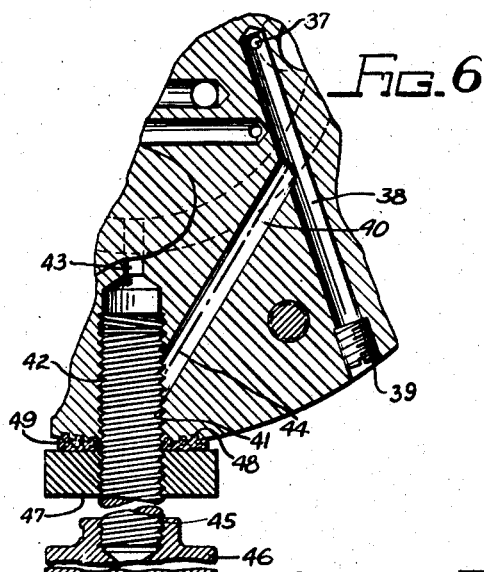
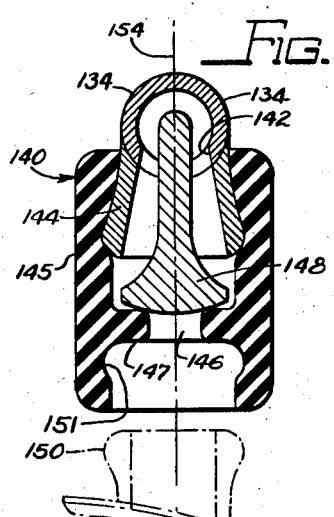
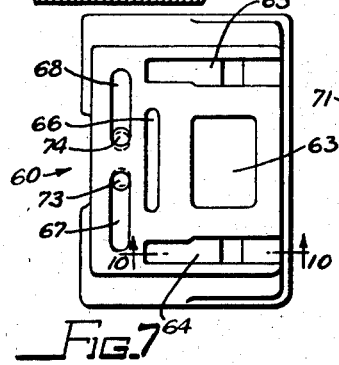
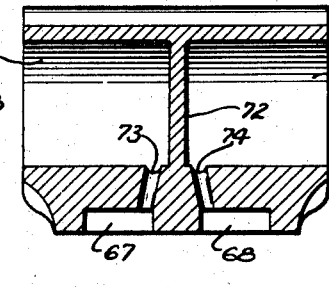
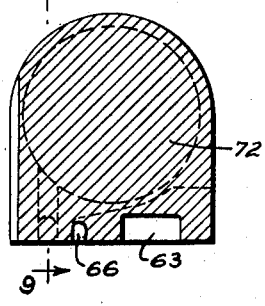
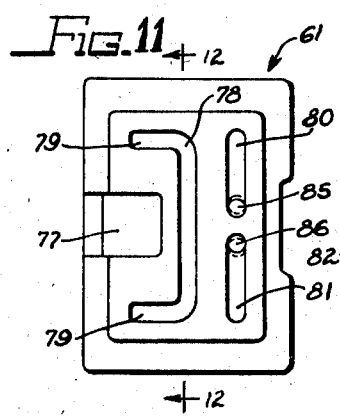
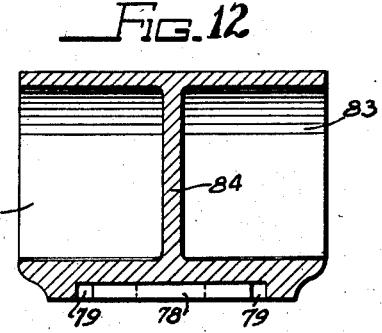
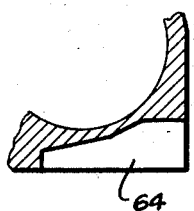
INVENTOR.
Emanuel Rawson
BY Norris Spector
Atty.

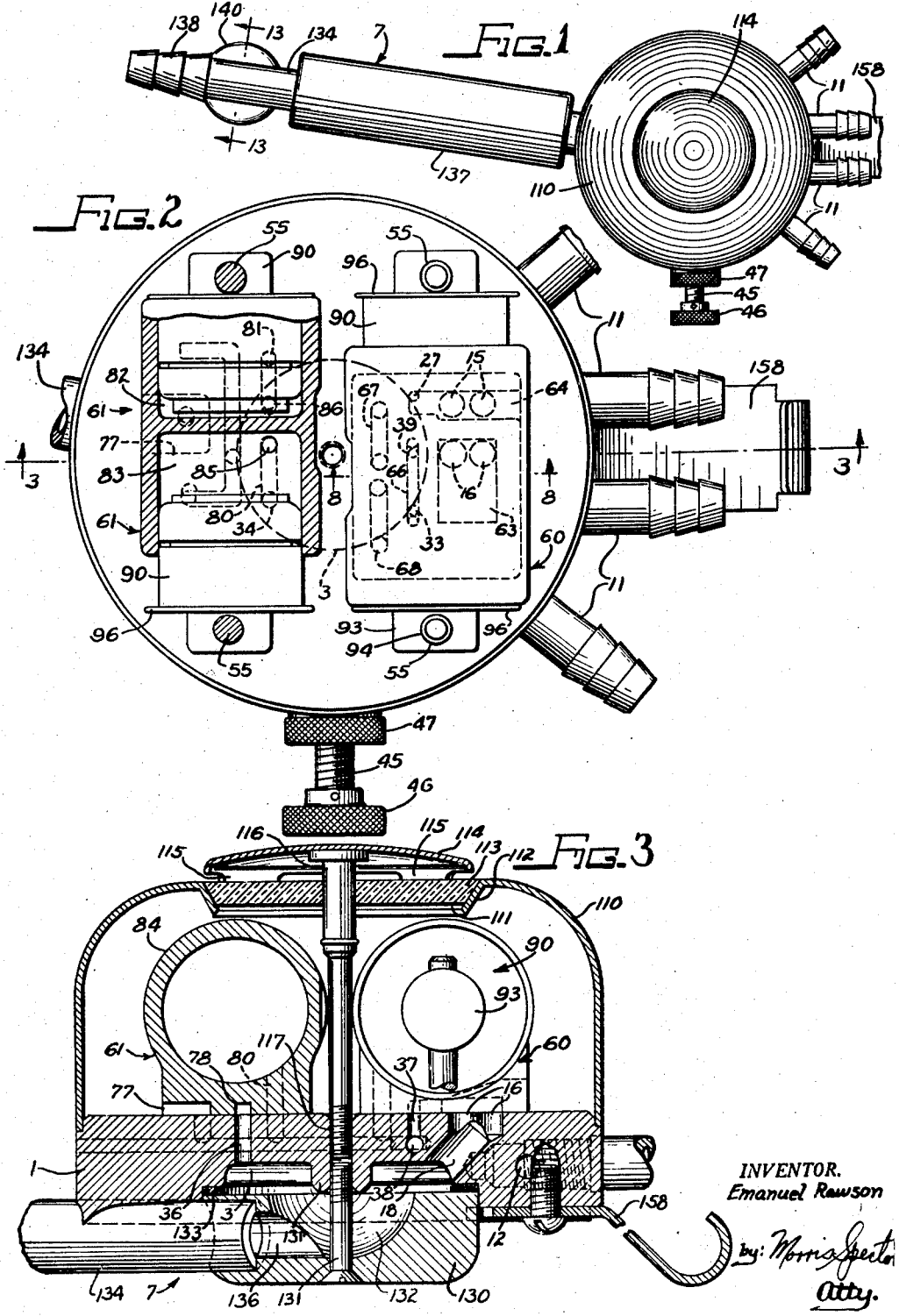

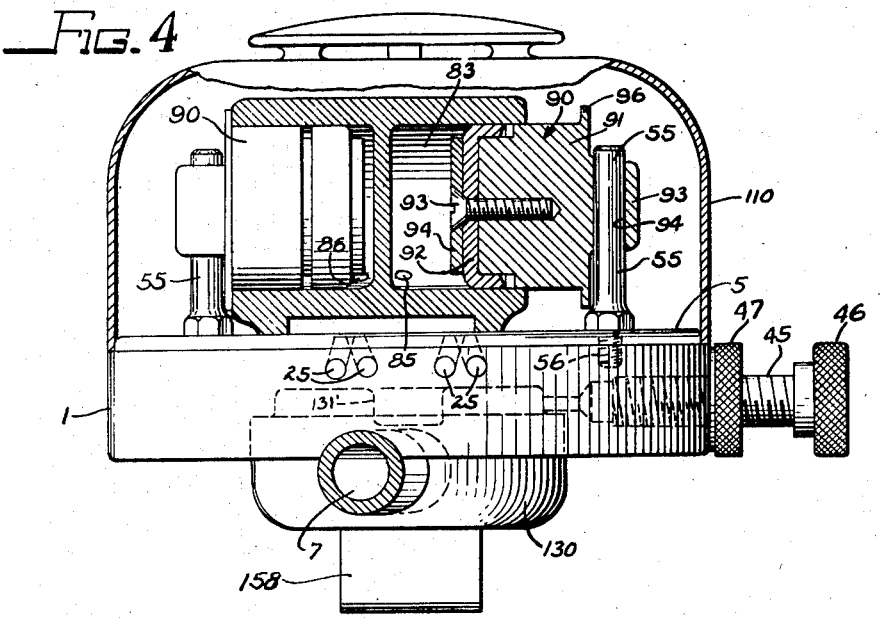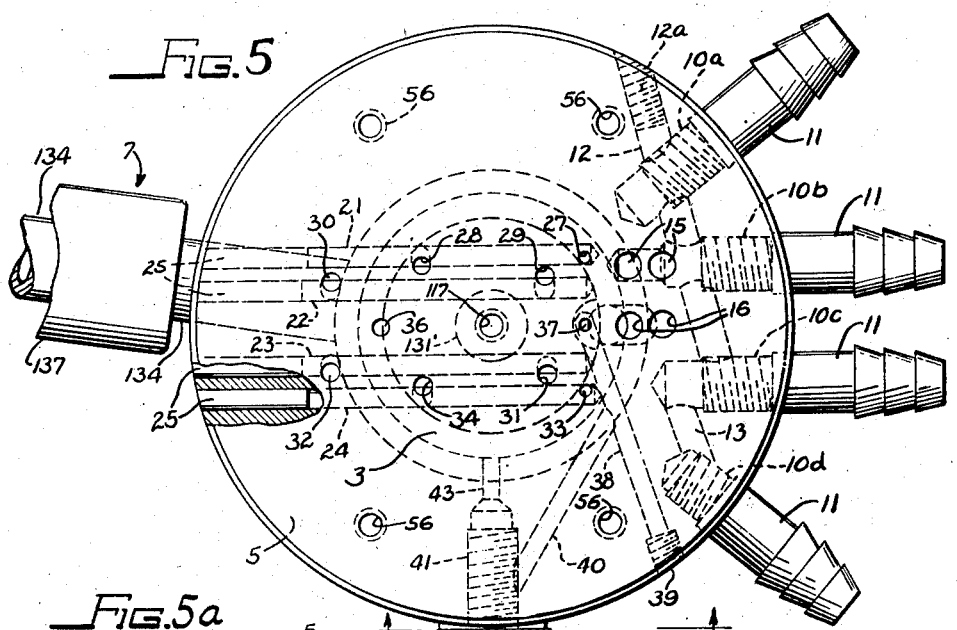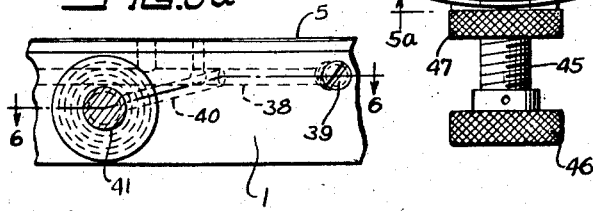

United States Patent Office 2,827,920
Patented Mar. 25, 1958

2,827,920

PULSATOR ASSEMBLY

Emanuel Rawson, Chicago, Ill., assignor, by mesne assignments, to Package Machinery Company, a corporation of Massachusetts Original application August 23, 1949, Serial No. 111,935, now Patent No. 2,665,702. Divided and this application August 12, 1950, Serial No. 179,067

2 Claims. (Cl. 137—515)

This application is a division of my co-pending application, Serial No. 111,935, filed August 23, 1949, now issued as Patent No. 2,665,702.

The present invention relates to vacuum type milking machine pulsators.

Pulsators of the type with which the present invention is primarily concerned consist of a block on which is mounted a reciprocating pulsation valve that applies vacuum and atmospheric pressure alternately to one or more pulsation lines. A timing or control valve on the valve block controls the frequency of the pulsations. Separate piston and cylinder combinations are controlled by and in turn operate the respective valves. The pulsator block of a pulsator of the above type has a number of air passageways therethrough forming parts of the vacuum and air circuits for the respective valves and cylinders.

It is one of the objects of the present invention to provide a pulsator block that is simple and economical of manufacture and is well adapted for mass production. In accordance with the principles of the present invention the pulsator block is so constructed that the starting material for making the block consists of a flat metal disc of the required thickness. Such discs may be economically formed by slicing the same from standard bar stock.

It is a further object of the present invention to provide a simple means for establishing vacuum connections to a pulsator.

It is a still further object of the present invention to provide a pulsator with a simple means for establishing vacuum connections to the container on which the pulsator is mounted.

Another object of the present invention is the arrangement of the air passageways in the pulsator block in such a manner as to facilitate cleaning thereof.

The attainment of the above and further objects of the present invention will be apparent from the following specification taken in conjunction with the accompanying drawings forming a part thereof.

In the drawings:

Figure 1 is a plan view of a pulsator of the present invention;

Figure 2 is a top view of the pulsator of the present invention with the cover thereof removed and with one of the cylinders shown in partial section;

Figure 3 is a section taken along the line 3—3 of Figure 2, with the pulsation valve shown in elevation;

Figure 4 is a view of the left side of Figure 2 with parts of the cover broken away and the timing valve shown in longitudinal section;

Figure 5 is a plan view of the pulsator block;

Figure 5a is a fractional end view of the pulsator block taken along the line 5a—5a of Figure 5;

Figure 6 is a horizontal sectional view taken along the line 6—6 of Figure 5a and looking in the direction of the arrows;

Figure 7 is a bottom view of the pulsation valve;

Figure 8 is a transverse sectional view of the pulsation valve taken along the line 8—8 of Figure 2 and looking in the direction of the arrows;

Figure 9 is a sectional view taken along the line 9—9 of Figure 8 and looking in the direction of the arrows;

Figure 10 is a fragmentary sectional view taken along the line 10—10 of Figure 7;

Figure 11 is a bottom view of the control valve;

Figure 12 is a sectional view taken along the line 12—12 of Figure 11; and

Figure 13 is a sectional view taken along the line 13—13 of Figure 1.

Reference may now be had more particularly to the drawings wherein like reference numerals designate like parts throughout.

The pulsator of the present invention comprises a pulsator block or body 1 which is a brass disc that may have been sliced from round bar stock. At its lower side it has a central circular bore forming a hollow chamber 3. The block has a circular top surface 5 that is ground and lapped to be perfectly flat. A vacuum line connector 7 is adapted to be connected to the bottom of the block 1 to establish vacuum connections to the chamber 3. The body 1 has on one side thereof four horizontally extending holes 10a, 10b, 10c and 10d, in each of which is a nipple 11 each for receiving a flexible hose which extends to a teat cup in a manner known in the art. The holes 10a, 10b and 10c are interconnected by a bore 12, the end of which is closed by a plug 12a, and the holes 10c and 10d are interconnected by a bore 13. As a result all four holes 10a, 10b, 10c and 10d are interconnected. The hole 10b is intersected by port holes 15—15 that are drilled vertically in the body 1 from the top surface thereof. Adjacent the ports 15 there are formed a pair of communicating holes or ports 16 which extend downwardly from the surface 5 to and intersect an inclined bore 18 that connects the ports 16 with the chamber 3.

A series of parallel air passages 21, 22, 23 and 24 are drilled from one side of the body 1 in the cylindrical portion thereof. The outer end of each of the four passages is permanently closed by a plug 25, each plug consisting of a short length of wire that makes a snug fit in the passageway and is soldered or otherwise permanently sealed therein with the outer face of the wire terminating flush with the cylindrical surface of the block 1. Two ports 27 and 28 are drilled from the top surface 5 to intersect the passage 21. Two other ports 29 and 30 are drilled from the surface 5 to intersect the passageway 22. Two other ports 31 and 32 extend from the surface 5 to and intersect the passageway 23 and two additional ports 33 and 34 are drilled from the surface 5 to and intersecting the passageway 24. It is thus apparent that the passageway 21 connects the ports 27 and 28, the passageway 22 connects the ports 29—30, the passageway 23 connects the ports 31—32, and the passageway 24 connects the ports 33—34.

A vacuum port or passageway 36 extends from the surface 5 to the chamber 3, as may be been from Figures 3 and 5. In addition to the above the pulsator body has a vacuum control port 37 that extends downwardly from the surface 5 to and intersects a bore or passageway 38. The passageway 38 is closed at one end by a plug 39. A bore or passageway 40 connects the passageway 38 with a bore 41 which is internally threaded as at 42. A bore 43 connects the bore 41 with the vacuum chamber 3, as may be seen from Figures 5 and 6. The bore 40 is at such an angle that a drill following along the center line 44 of the bore 40 can be used, which drill enters through the bore 41. As a result the passageway 40 may readily be cleaned as by passing a wire therethrough through the open end of the bore 41. The bore 41 is closed by a manually adjustable speed regulating screw 45 that has a knurled adjusting head 46 and may be locked in position by a lock nut 47. A plurality of concentric grooves 48 are formed in the body 1 surrounding the bore 41. A washer 49 of leather or the like is compressed into the grooves 48 by the lock nut 47 and acts to tension the lock nut and thereby facilitates retaining of the regulating screw 45 in the position in which it is adjusted.

Four mounting posts 55 are mounted on the top of the pulsator body, as by threading the posts into tapped openings 56 in the top of the pulsator body. These posts are adapted to receive and hold pistons that extend into cylinders, to be presently more fully described.

A pulsation valve 60 and a timing or control valve 61 are positioned on the flat surface 5. Each of the valves has a flat bottom surface adapted to slide along the surface 5. The pulsation valve 60 has, on the under side thereof, a rectangular recess 63 which is adapted to overlie the vacuum passageways 16 and connect them alternately with the ports 15, depending upon the position of the pulsation valve. The pulsation valve 60 also has a pair of similar slots 64—65 on opposite sides of the recess 63 each of which slots is open at the base of the pulsation valve and at the side thereof. In addition the under surface of the pulsation valve 60 has an elongated recess 66 extending across the transverse center line of the valve, and a pair of separate shorter recesses 67—68. Above the recesses and slots 63 through 68 the pulsation valve has two similar cylinder bores 70 and 71 formed therein separated by a wall 72 which maintains the cylinder bores separate from one another. A port 73 is drilled from the under side of the pulsation valve at the recess 67 and connects the recess with the interior of the cylinder 71 adjacent the dividing wall 72. A similar port or passageway 74 connects the recess 68 with the interior of the cylinder 70.

The control valve 61 has a flat bottom surface in which are formed, respectively, a rectangular recess 77 which opens to the atmosphere at one side of the control valve, and a U-shaped recess 78 having arms 79—79, and a pair of rectangular recesses 80—81. Above the base of the control valve the valve is provided with two cylinders 82—83 separated by a wall 84. A port or passageway 85 extends from the recess 80 into the cylinder 82 adjacent the wall 84, and a similar port or passageway 86 extends from the recess 81 into the cylinder 83 adjacent the partition wall 84.

Similar pistons 90 extend into each of the bores 70, 71, 82 and 83. Each piston comprises a body 91 undercut at its forward end to receive a cup-shaped gland 92, of leather or the like, which is held in place by a screw 93 and a washer 94. A circular peripheral flange 96 on the piston limits the extent of insertion of the piston into the cylinder bore. On its rearward side the piston has a circular protuberance 93 which has a hole 94 therethrough to permit sliding of the piston onto one of the posts 55. The two pistons are assembled within the cylinder bores 82—83 and then the assembly is slipped over a pair of posts 55, the posts passing through the openings 94 in the pistons. This fixes the positions of the pistons and permits sliding movement of the control valve between the two posts 55. The pulsation valve likewise has two pistons 90 similarly assembled therein and held each on one of the other two posts 55.

An explanation will now be given of the manner of operation of the mechanism thus far described. Assume that the parts are in the positions illustrated and that vacuum is applied through the connector 7 to the chamber 3. The vacuum connection extends by way of the holes or passageways 16, thence by way of the recess 63. At this time the passageways 15 are overlaid by the recess 64 which, being open to atmosphere, applies atmospheric pressure to the ports 15 and the four nipples 11. At the same time vacuum is applied from the chamber 3 by way of the bore 43 (Fig. 6), thence through the space between the threads of the regulating screw 45 and the threads of the bore 41, thence by way of the passageways 40 and 38 to the vacuum port 37 which is thus always connected to vacuum by way of the long spiral passageway between some of the threads of the regulating screw and the threads of the bore 41. The port 37 is overlaid by the recess 66 which at this time extends to the port 33. Vacuum is thus extended to the port 33 and thence through the passageway 24 to the port 34. The port 34 is overlaid by the passageway 80 which, through the port 85, communicates with the interior of the cylinder 83. Vacuum is thus applied to the interior of the cylinder 83 thereby drawing the air out of that cylinder. At the same time the port 27 is under the slot 64 of the pulsation valve so that atmospheric pressure is applied through the slot 64, port 27, passageway 21 and the port 28, which is overlaid by the recess 81 that connects with the cylinder 82 through the passageway 86 in the control valve. Atmospheric pressure is thus applied to the cylinder 82. Since there is atmospheric pressure on one side of the dividing wall 84 and vacuum on the other side thereof the control valve 61 commences to move in a direction downwardly as seen in Figure 2, to its alternate position. The rate of its movement is determined by the rate of air flow through the restricted passageway set by the regulating screw 45.

When the control valve has traveled to its alternate position abutting the flange 96 of the piston it establishes vacuum connections for operating the pulsation valve to its alternate position. These connections are as follows: Vacuum is applied from the passageway 36 and recess 78 to one of the arms 79 thereof which is now over the port 30. This establishes vacuum connection from the port 36 by way of the passageway 78 to the port 30, thence by way of the passageway 22 to the port 29 which is overlaid by the recess 67 of the pulsation valve. The recess 67 communicates the vacuum connection to the cylinder 71 by way of the passageway 73. At the same time the atmosphere recess 77 of the control valve 61 is over the port 32, thus connecting atmospheric pressure via that port and passageway 23 to the port 31, which port 31 is overlaid by the recess 68 in the pulsation valve, which, through the port 74, connects atmospheric pressure to the cylinder 70 of the pulsation valve. The cylinders of the pulsation valve thus have atmospheric pressure on the lower side of the wall 72 and vacuum on the opposite side thereof, as seen in Figure 2. The pulsation valve now moves in a direction upwardly, as seen in Figure 2, to its alternate position. It moves to that position rapidly because the vacuum and atmospheric connections to the cylinders of the pulsation valve entirely by-pass the restricting screw bore 41. In its alternate position the recess 63 of the pulsation valve connects the vacuum ports 16 with the ports 15 thus applying vacuum to the nipples 11. The port 33 is now open to the atmosphere, thereby applying atmospheric pressure through the passage 24 to the port 34 which is overlaid by the slot 80 of the control valve 61. At this time the recess 66 connects the vacuum port 37 with the port 27 thus applying vacuum through the port 27 and passageway 21 to the port 28 which is overlaid by the recess 81 of the control valve, which recess 81 is connected to the cylinder 82 by passage 86. The control valve thus immediately commences to return to the position illustrated in Figure 2 and, when it returns to that position, it establishes connections for immediately returning the pulsation valve to the position illustrated in Figure 2. It is thus apparent that by this arrangement when the pulsation valve reaches an extreme position it establishes vacuum and atmospheric connections for moving the control or timing valve from the position in which it is to its alternate position and that the control valve moves at a speed determined by the setting of the screw 45. When the control valve reaches its alternate position it then establishes vacuum connections for moving the pulsation valve to a position other than in which it is. The pulsation valve and the control valve thus reciprocate between the posts 55—55 alternately.

The pistons for each pair of cylinders are self-aligning because each piston is free to turn about the vertical axis of its mounting post 55. If there is any wear on the rubbing surfaces constituting the bottoms of the valves and the corresponding parts of the top 5 on which the valves slide this wear does not affect the seating of the valves because the pistons are free to slide downwardly on the mounting posts and thus permit the valves to be self-seating on the surface 5. Each valve, with its cylinder bores formed therein and with its associated pistons constitutes a pneumatic mechanism which may easily be removed from the pulsator block 1 by simply lifting the same along the posts 55, and may be replaced equally easily. This facilitates inspection and repair of the mechanism.

The pneumatic mechanisms are enclosed within a dome-shaped cover 110 the top of which has a circular opening 111, the surrounding metal of the cover being flared downwardly and at an angle, as indicated at 112. A porous metal filter disc 113 rests on the seat 112 and is held in place by a cap 114 that has fingers 115 bearing against the filter disc 113 and spacing the cap 114 therefrom to allow atmospheric air into the space between the cap and the filter disc. The shank of a screw 116 is welded to the under side of the cap 114 and makes a snug sliding fit through the filter 113 and at its bottom is threaded into a tapped hole 117 at the top of the pulsator body.

An explanation will now be given of the construction of the vacuum line connector 7 by which vacuum is connected to the pulsator block 1. The vacuum line connector comprises a circular cup-shaped fitting 130 the top of which is machined perfectly flat. The top of the cup-shaped fitting 130 fits into a circular cavity at the back of the pulsator block 1 and is secured to the block 1 by a screw 131 that threads into the block. The top of the fitting 130 has a cavity 132 that opens into the pulsator block chamber 3. A gasket 133 over the top surface of the fitting 130 makes an air tight sealing fit between the fitting and the base of the chamber 3 of the pulsator block 1. A metal pipe 134 fits into a bore in the fitting 130 being press fitted therein and suitably sealed in any desired manner, as by solder, and establishes communication with the cavity 132 through a circular bore 136. The pipe 134 has a handle 137 thereon to facilitate carrying of the pulsator. Beyond the handle the pipe 134 terminates in a hose-receiving nipple 138 which is adapted to receive the end of a vacuum line hose to extend vacuum to the pulsator via the pipe 134.

The pulsator of the present invention is adapted to be positioned upon a milk receptacle and to establish vacuum connections to the receptacle. To that effect the pipe 134 has a check valve 140 thereon which check valve is of a construction such as is shown more particularly in Figure 13. A hole 142 is formed on the under side of the pipe 134 and a vacuum fitting 144 is welded around the hole 142. The vacuum fitting is circular in horizontal cross section. A tubular valve body 145, of rubber or the like, is tensioned around the fitting 144. To facilitate retention of the valve body on the fitting 144 the fitting is outwardly flared downwardly from the pipe 134. The valve body 145 has a central opening 146 formed in a circular ledge 147 that constitutes a valve seat for a check valve 148. The check valve head seats by gravity on the ledge 147 and closes the opening 146. The check valve is adapted to be raised by a preponderance of pressure below the check valve as compared to the vacuum above the check valve. The check valve includes a stem extending upwardly of the head into the fitting 144 and into the pipe 134. When the check valve is raised the stem, by engagement with the pipe 134, limits the upward movement of the stem to an amount such that the bottom of the head fails to close the bottom of the fitting 144 so that vacuum from the pipe 134 is extended through the fitting 144 and through the open check valve to the opening or port 146 and thence to the outlet side of the valve body 145. The rubber valve body 145 is adapted to be snapped over a fitting 150 at the top of the receptacle on which the pulsator is to be mounted, so that the ledge 147 seats on top of the fitting and the valve body 145 makes a vacuum tight seal around the fitting. The vacuum fitting 144 and the valve body 145 and the check valve 148 are all circular in cross section when viewed on a section taken in a plane at right angles to the longitudinal center line 154.

The pulsator block 1 has a pulsator spring 158 secured to the under side thereof. This spring merely extends downwardly to provide a leg for supporting the pulsator on the receptacle on which it is mounted. The pulsator is adapted to be positioned on a receptacle in the manner illustrated in my application for Letters Patent entitled, "Suspended Milker," Serial No. 111,934, filed August 23, 1949, now issued as Patent No. 2,693,703, to which reference may be had. The pulsator spring 158 is hook-shaped at its forward end so that the cover for the milk receptacle is suspended therefrom when the pulsator is lifted from the receptacle, all as shown in my above identified application.

When the pulsator is used and in operation the valve 148 is drawn upwardly by vacuum within the pipe 134 to apply vacuum to the valve body and the receptacle on which the pulsator is mounted. If the vacuum connection is thereafter released from the pipe 134, as, for instance, by disconnection from the main vacuum line, the check valve 148 will close and thereby prevent atmospheric air from rushing back through the pipe 134 into the milk receptacle on which the pulsator is mounted.

It is to be noted that the pulsator of the present invention lends itself readily to cleaning. To that effect the screw 131 is unscrewed from the pulsator block, thereby permitting removal of the fitting 130 and its vacuum line connector 7 from the pulsator. This permits cleaning of the fitting since it is easy to insert a brush through the nipple 138 to clean the pipe 134. Any foreign matter that may have accumulated therein is easily removed through the bore 136 and the cavity 132. With reference to the pulsator block the cavity 3 is easily cleaned as may be seen. By removing the clean-out plug 39 and the speed regulating screw 45 it is a simple matter to insert a cleaning brush into the bore 38 and into the bore or passageway 41. When the screw 45 has been removed it is possible to insert a cleaning brush into the bore 40, since the center line of this bore passes through the opening in the end of the bore 41. It is further to be noted that the pulsator block 1 is of a very simple construction. The top and bottom surfaces of this block are flat, thereby facilitating manufacture thereof, as well as facilitating cleaning thereof. As previously stated, this block may be formed from a round brass rod, of the necessary diameter, by slicing a piece of the requisite thickness from the rod stock. This greatly reduces the cost of manufacture of the same as compared to prior constructions wherein the pulsator block is of a shape that precluded use of bar stock as mentioned above. It is further to be noted that the same tapped hole 117 that receives the cap holding screw 116 also receives at its opposite end the screw 131 for securing the fitting in place. As a result a single drilling and tapping operation provides threaded bores for both screws 116 and 131. In order to provide the necessary length of tapped bore a round projection 131' is left at the bottom of the pulsator block in the machining of the bore 3.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. In combination, a vacuum type milking pulsator valve block having a vacuum chamber located at one surface thereof as hereinafter defined, said block having a pulsator seat at another surface thereof and said block having air passageways therein extending from said chamber to and opening at the pulsator seat surface of the block, and means for extending vacuum connections to the chamber comprising a fitting positioned on said block, there being a chamber hereinbefore mentioned, at the interface between the block and the fitting, said chamber comprising a recess formed in at least one of said blocks and said fitting at said interface, means holding said fitting in place and clamping it to said block, a vacuum pipe connected at one end to and integral with the fitting, the opposite end of the pipe being adapted to receive a vacuum hose, said pipe having a branch between its two ends, a resilient plug-in type vacuum connector valve body terminating said branch, said body and said branch being telescoped one with respect to the other and the valve body being deformed by said branch and held thereon by the natural resiliency of the valve body, the end of the valve body opposite said branch having means for making a plug-in type telescoping vacuum tight connection with the interior of the valve body, a check valve within the opposite end of the valve body, said check valve being adapted to be moved to its open position by vacuum in the vacuum pipe and being biased for movement to its closed position upon loss of vacuum in said vacuum pipe thereby to close off the air flow through the valve body, and a pulsator carrying handle on said pipe between the branch and the pulsator.

2. In combination, a vacuum type milking pulsator valve block having a vacuum chamber located at the lower surface thereof as hereinafter defined, said block having air passageways therein extending from said chamber to and opening at the pulsator seat surface of the block, and means for extending vacuum connections to the chamber comprising a fitting positioned on said block, there being a chamber hereinbefore mentioned, at the interface between the block and the fitting, said chamber comprising a recess formed in at least one of said blocks and said fitting at said interface, means holding said fitting in place and clamping it to said block, a vacuum pipe connected at one end to and integral with the fitting, the opposite end of the pipe being adapted to receive a vacuum hose, said pipe having a branch between its two ends, and a resilient plug-in type vacuum connector valve body terminating said branch, said body and said branch being telescoped one with respect to the other and the valve body being deformed by said branch and held thereon by the natural resiliency of the valve body, the end of the valve body opposite said branch having means for making a plug-in type telescoping vacuum tight connection with the interior of the valve body a check valve within the opposite end of the valve body, said check valve being adapted to be moved to its open position by vacuum in the vacuum pipe and being biased for movement to its closed position upon loss of vacuum in the vacuum pipe thereby to close off the air flow through the valve body.

References Cited in the file of this patent
UNITED STATES PATENTS

| | | |
|---|---|---|
| 342,478 | Tatum | May 25, 1886 |
| 421,057 | Schuberth | Feb. 11, 1890 |
| 521,530 | Wall | June 19, 1894 |
| 1,230,026 | Pullen | June 12, 1917 |
| 1,270,429 | Macartney | June 25, 1918 |
| 1,270,473 | Warnock | June 25, 1918 |
| 1,337,462 | Marulli | Apr. 20, 1920 |
| 1,392,346 | McCornack | Oct. 4, 1921 |
| 1,506,321 | Oakes | Aug. 26, 1924 |
| 1,638,776 | Martocello | Aug. 9, 1927 |
| 1,844,613 | Thompson | Feb. 9, 1932 |
| 2,168,207 | Haultain | Aug. 1, 1939 |